Sept. 26, 1939.  B. A. MEININGHAUS  2,173,851
METHOD AND APPARATUS FOR INCREASING THE SHARPNESS OF TUNING
Filed Nov. 5, 1935  2 Sheets-Sheet 1
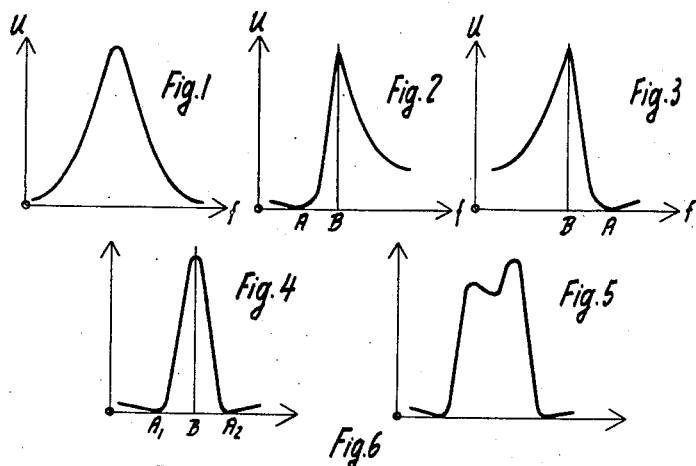
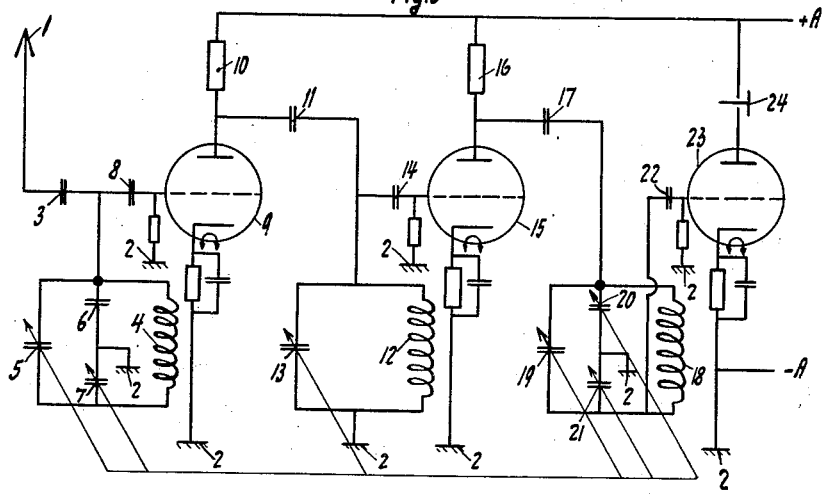
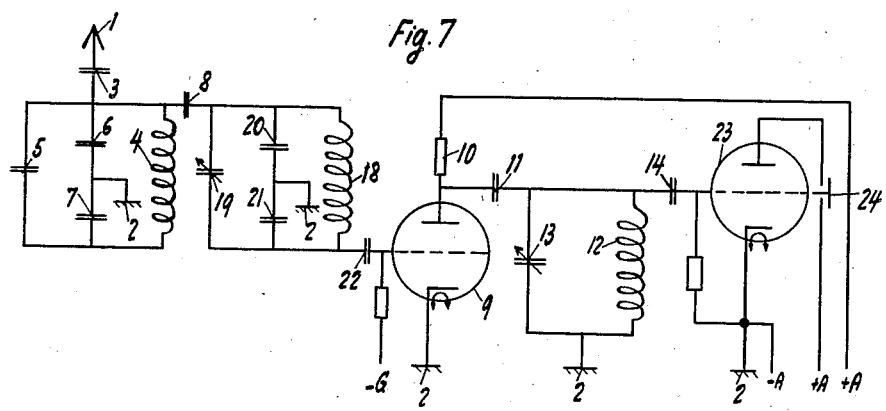
Inventor
BERNHARD AUGUST MEININGHAUS
Lackenbach & Hirschman
ATTORNEYS Sept. 26, 1939.  B. A. MEININGHAUS  2,173,851
METHOD AND APPARATUS FOR INCREASING THE SHARPNESS OF TUNING
Filed Nov. 5, 1935  2 Sheets-Sheet 2
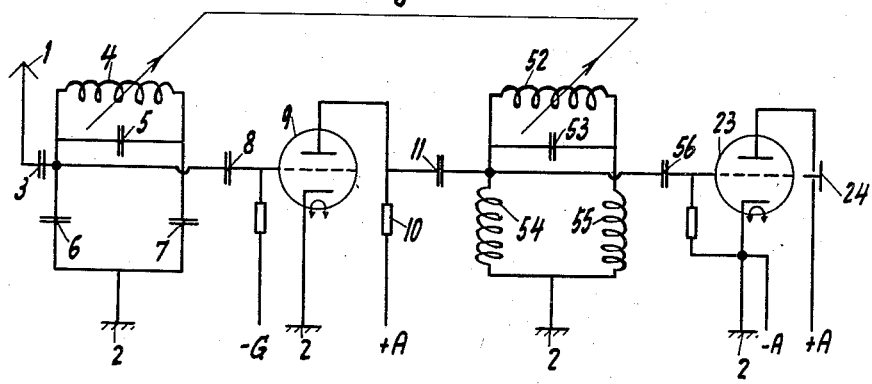
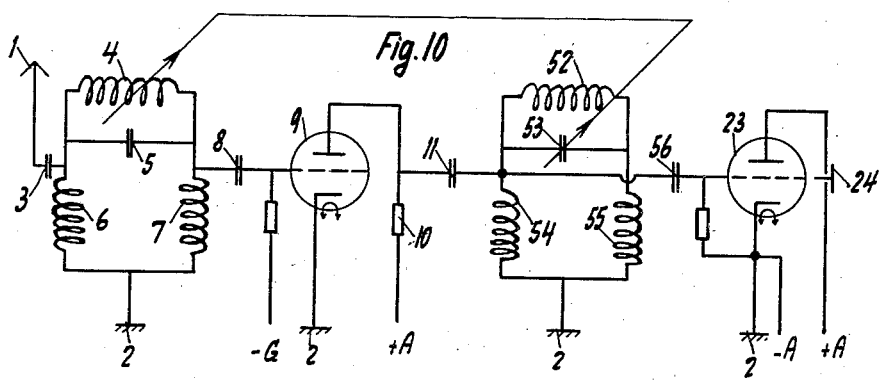
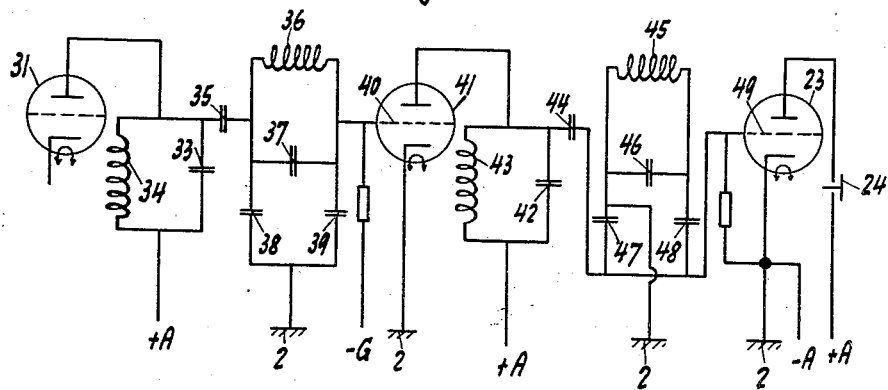
Inventor
BERNHARD AUGUST MEININGHAUS
Lackenbach + Hirschman
ATTORNEYS Patented Sept. 26, 1939

2,173,851

UNITED STATES PATENT OFFICE 2,173,851

METHOD AND APPARATUS FOR INCREASING THE SHARPNESS OF TUNING

Bernhard August Meininghaus, Dortmund, Germany

Application November 5, 1935, Serial No. 48,319
In Germany November 15, 1934

17 Claims. (Cl. 178—44)

The present invention relates to electrical oscillating circuits for the reception or generation of high frequency oscillations.

It is known to produce an increased supression of oscillations lying outside of the filter range in oscillating circuits of this kind, by improving the form of the resonance curves of the oscillating circuit by creating minimum points near the maximum points. In particular, it has been proposed to produce this kind of resonance curve by creating minimum points by means of blocking circuits formed of parallel capacities and inductances.

The known circuits have, however, certain disadvantages, especially an undesirable increase of damping in the range of the desired frequency band, and cause also a reduction of the effective energy, inadequate sharpness of separation outside of the desired resonance frequency band, and wide variability of the width of the resonance frequency band upon variation of the frequency.

According to the present invention, a considerably increased suppression of oscillations lying outside of the reception band can be attained with comparatively slight weakening of the effective voltage by producing minimum points in the resonance curve—advantageously at both sides of the maximum point—with the aid of reactances in series with a parallel resonance circuit, the whole forming what may be termed a "suction" circuit. The production of the minimum points is attained by a series resonance (suction circuit) by means of simultaneous supply and withdrawal of energy through a further additional reactance bridging the series arrangement of the parallel resonance circuit and an additional reactance. The maximum point then is produced not alone by the parallel circuit, but by a parallel resonance of this circuit with a further additional reactance which can be formed of several capacities or several inductances, the additional bridging reactance facilitating the rejection of disturbing oscillations.

According to the invention, therefore, it is proposed to arrange a further additional reactance in parallel with the series arrangement of the parallel resonance circuit and a reactance, through which further reactance the energy is supplied and withdrawn and which reduces the total reactance hindering an adequate withdrawal of the disturbing oscillations, but which on the other hand enters in the filter range into the parallel resonance producing the maximum point together with the elements of the series connection. It is most advantageous for both additional reactances to have the same reactance character, that is, they are either both inductive or both capacitive, and for tuning the arrangement the reactance value of one of the elements forming the parallel circuit is varied in order to maintain as constant as possible the frequency band between the maximum and minimum points throughout the whole tuning range.

By the use of the further additional reactance there occurs a division of potential, and thus a certain weakening of the effective voltage. However, with the same frequency band between maximum points and minimum points, the sum of the reactances through which disturbing oscillations lying outside of the filter range must flow off, is reduced to a considerably greater degree, so that a marked improvement in the total effect results. If the additional reactance which is in parallel with the series connection consists of a capacity, then according to a further development of the invention this capacity is made to exceed the value of the anode-cathode capacity occuring in the usual construction of amplifier tubes, and is preferably greater than 9 cm. (=10 pikofarads= 10 $\mu\mu$ F), a separate condenser or condensers being advantageously arranged.

When the minimum point in the resonance curve of an oscillating circuit is formed through an additional reactance (suction circuit) oscillating in series with a parallel resonance circuit, an increased suppression of oscillations lying outside of the filter range can, according to a further development of the invention, be attained with comparatively slight weakening of the effective voltage by forming the additional reactances as inductances with inductive reactance character in the resonance range. The lower disturbing oscillations (for example, long wave broadcast) which are the most difficult to filter out, are effectively conducted away by the additional inductances of the type mentioned.

In all cases the sharpness of separation in the neighborhood of the filter range can be improved by the arrangement of further oscillating circuits with opposed asymmetrical resonance curves, while the sharpness of separation at greater distances from the filter range can be improved by the arrangement of additional oscillating circuits with symmetrical resonance curves, the utilization of cascade or band filter circuits being possible.

The combinations which result from the application of the principles above described are set forth in greater detail below in connection with the specific embodiments of the invention illustrated in the drawings. As the additional reactances produce a division of potential they are designated below as parts of a voltage divider in the interest of concise and clear description.

Figs. 1 to 5 show different forms of resonance curves with the frequency $f$ as abscissal and the voltage U as ordinates.

Figs. 6 to 10 show circuit diagrams according to the present invention.

In Fig. 1 is shown the resonance curve of a normal oscillating circuit of known form. Fig. 2, on the other hand, shows an asymmetrical resonance curve of an oscillating circuit according to the present invention which has at the point B a voltage maximum and near the point B at the point A a voltage minimum. The resonance curve in Fig. 3 is the mirror image of that in Fig. 2. The individual resonance curves according to Figs. 2 and 3 combine to a resulting resonance curve, shown in Fig. 4, in which on both sides of the voltage maximum B there is always at least one voltage minimum $A^1$ and $A^2$. If two oscillating circuits with opposed asymmetrical resonance curves are coupled according to the proposals of the present invention, for example by band filter connection, the form of the resonance curve approximates that shown in Fig. 5.

In Figs. 6 to 10 +A shows the connection to the positive pole of the anode battery, —A the connection to the negative pole of the anode battery and to the positive pole of the grid bias battery, and —G the connection to the negative pole of the grid bias battery.

Fig. 6 is a complete circuit diagram of a receiver constructed in accordance with the present invention. The high frequency voltage occurring between the aerial 1 and the earth 2 is led via the capacity 3 to the oscillating circuit consisting of the inductance 4, the capacity 5, and the capacitive voltage dividers 6, 7. For the supply of the high frequency voltage is used the fall in potential caused thereby at the partial reactance 6 of the voltage divider. The supply—if desired omitting the capacity 3—can also take place through a part of the capacitative reactance 6 if this is subdivided. The removal of the high frequency voltage is effected from the same part reactance 6 of the voltage divider 6, 7 as the supply. This useful voltage is led through the capacity 8 to the grid of the amplifying valve 9. The amplified high frequency voltage is withdrawn from the external resistance 10 of the valve 9 and led via the capacity 11 to the oscillating circuit 12, 13 consisting of the inductance 12 and the capacity 13. From this oscillating circuit 12, 13 of known arrangement the high frequency voltage is transmitted via the condenser 14 to the valve 15. The amplified high frequency voltage from the valve 15 is transmitted from the external resistance 16 of this valve through the condenser 17 to the oscillating circuit which consists of the inductance 18 and the capacity 19 and is bridged by the capacitative voltage divider 20, 21. The voltage supply is here effected through the part reactance 20 of the voltage divider 20, 21, whilst the voltage removal is effected from the part reactance 21 of the voltage divider 20, 21. The condenser 22 leads the high frequency voltage to the valve 23 which rectifies and amplifies it so that the low frequency is audible in the telephone 24. To the oscillating circuits 4, 5 and 18, 19 are connected reactances 6, 7 and 20, 21 which produce, for example, in the resonance curve of the oscillating circuit 4, 5 a minimum peak point which lies at a lower frequency than the maximum peak point (as in Fig. 2), whilst in the resonance curve of the oscillating circuit 18, 19 a minimum peak point is obtained beyond the maximum peak point of the resonance frequency (as in Fig. 3). In both cases the oscillating circuits consist of the reactances 4, 5 or 18, 19 connected in parallel, and are brought into resonance with the additional reactances 6, 7 or 20, 21, whose frequency deviates from the individual frequency of the circuits 4, 5 or 18, 19. All the ordinate values of the resonance curves in the resonance frequency band are higher than the ordinate values of these minimum peak points. The individual resonance curves of the oscillating circuits, therefore, intersect within the resonance frequency band at higher ordinate values than those of the minimum peak point. As regards the dimensions of the capacitative voltage dividers shown it has been found particularly advantageous to make the capacity values of the two part reactances at most 500 cm. apart from one another. The ratio of the part capacity of the voltage divider over which energy is simultaneously supplied and withdrawn to the other part capacity is advantageously kept as small as possible, whilst in the case of separate voltage withdrawal and supply over different part capacities the capacity value of the one reactance should not exceed ten times the capacity value of the other reactance. Maximum efficiency is obtained in the latter case when the capacity values of the part reactances are as close to one another as possible. The valve capacity and other capacities coming into action which lie in parallel with the part capacities should be reckoned in. In the circuit shown in Fig. 6 the character of the voltage dividers 6, 7 and 20, 21 is capacitative. The different position of the minimum peak points with regard to the maximum peak points in the resonance curves is achieved by reason of the fact that in the oscillating circuit 4, 5, 6, 7 a "suction" circuit oscillating in series resonance is formed consisting of 4, 5, 7, such circuit having practically no resistance in the resonance condition and permitting the energy to flow off, for example, to the earth; whilst in the oscillating circuit 18, 19, 20, 21 a "block" circuit oscillating in parallel resonance is formed through 18, 19, such circuit having an infinite resistance in resonance. In both cases the maximum peak point is evoked by the whole tuning circuit 4, 5, 6, 7 or 18, 19, 20, 21 oscillating in parallel resonance. As the initial circuit for such an arrangement the oscillating circuit 4, 5, 6, 7 is particularly suitable because with it the voltage supply and withdrawal take place over the same part reactance 6 of the voltage divider 6, 7, as the series resonance here occurring is less sensitive to damping than a parallel resonance. The oscillating circuit 12, 13 of known arrangement is provided for the purpose of preventing the occurrence of disturbing waves on the opposite side of the minimum peak point to the maximum peak point and it is arranged in the stage which causes the least damping, in the present case between the two oscillating circuits 4, 5, 6, 7 and 18, 19, 20, 21 which have opposed asymmetrical resonance curves. To equalise the difference in frequency displacement of the minimum peak points in the resulting resonance curve of the oscillating system over the whole tuning range the condensers 7 and 20, 21 and the voltage dividers 6, 7 and 20, 21 are mechanically coupled with the tuning condensers 5 and 19 so that they are altered in step with them during the tuning operation. Owing to the mechanical coupling the condensers 20, 21 are altered in the same proportion as the tuning condenser 19, whereby the distance of the minimum peak point in the resonance curve from the maximum peak point is kept approximately constant. In order to simplify the construction only the condenser 7 of the voltage divider 6, 7 is altered in step with the tuning condenser 5. Conveniently in this case the alteration in capacity of the condenser 7 is made smaller than that of the tuning condenser 5 in order to avoid incompleteness of equalisation.

The operation of the circuit of Fig. 6 will be understood when it is considered that the inductance 18 and the capacity 19 are in parallel resonance in the resonance condition and block the flow of current from the condenser 17 to the condenser 22; on the other hand, inductance 4 and capacity 5, which are connected in parallel and which act as a single reactance, are in the resonance condition in series rosonance with the additional capacity 7 and conduct the current to the earth 2 practically without any resistance. In this way the minimum points of the resonance curve according to Fig. 4 are produced. The maximum peak points arise from the fact that the additional capacities 20 and 21 are brought into parallel resonance with the block circuit 18, 19 and likewise the reactances 4, 5 and 7—oscillating in series resonance for producing a minimum— are brought into parallel resonance with the additional capacity 6.

In Fig. 7 the same references are used for the initial circuit 4, 5, 6, 7. This initial circuit is coupled by the condenser 8 in this case directly with the oscillating circuit 18, 19, 20, 21 which has a resonance curve of opposite asymmetrical form to that of the oscillating circuit 4, 5, 6, 7. To the capacity 22 is connected the valve 9, the capacity 11, and the oscillating circuit 12, 13 of known form. Then follow the low frequency parts 23, 24. In this arrangement, there are the two oscillating circuits 4, 5, 6, 7 and 18, 19, 20, 21 with opposite asymmetrical resonance curves which are mutually coupled disposed in one stage (band filter connection) whilst the additional oscillating circuit 12, 13 of known arrangement is connected behind this stage.

In Fig. 8 the valve 31 is an intermediate frequency amplifying valve of a heterodyne receiver which works on the oscillating circuit of normal arrangement 33, 34 as anode blocking circuit. The fall in high frequency potential occurring at this external resistance is transferred from the capacity 35 to the part capacity 38 of the voltage divider 38, 39 which bridges the oscillating circuit 36, 37. The fall in high frequency potential at the part capacity 39 of the voltage divider 38, 39 reaches the grid 40 of the valve 41 which operates as anode blocking circuit on the oscillating circuit 42, 43 of known arrangement. The fall in high frequency potential at the external resistance of this valve is led by capacity 44 to the oscillating circuit 45, 46, 47, 48. The fall in potential occurring at the part capacity 47 of the voltage divider 47, 48 reaches the grid 49 of the valve 23 which rectifies and amplifies the high frequency and makes it audible in the telephone 24. With this arrangement, therefore, there are provided in one stage the oscillating circuits 36, 37, 38, 39 whose resonance curve possesses maximum and minimum peak points and an oscillating circuit 33, 34 which has symmetrical resonance curve. As in this manner the oscillating circuit 33, 34 of known arrangement lies in the anode circuit of the valve 31, this valve operates with improved efficiency. The same holds good for the oscillating circuit 42, 43 which lies in the anode circuit of the valve 41.

In Fig. 9 the same reference characters are used for the initial circuit as in Figs. 6 and 7. The part reactance 54 of the inductive voltage divider 54, 55 which bridges the oscillating circuit 52, 53 is used for the supply and withdrawal of voltage. The withdrawn voltage is led through the capacity 56 to the valve 23 which rectifies and amplifies it and renders it audible in the telephone 24. In this arrangement the tuning is effected by altering the inductances 4 and 52 of the oscillating circuits 4, 5, 6, 7 and 52, 53, 54, 55. Hereby is obtained an approximately linear relationship in the alteration of the frequency displacements of the minimum peak points from the maximum peak point. The voltage divider 6, 7 has a predominantly capacitative character whilst the voltage divider 54, 55 has a predominantly inductive character. Consequently the linear relationship is reversed and is practically removed so that the displacement of the minimum peak points in the resulting resonance curve from one another remains constant. The effect is also obtained that by change in the character of the voltage divider alone a mirror image formed of the asymmetrical resonance curves of the individual oscillating circuits follows, the voltage supply and withdrawal being effected in the same manner.

In Fig. 10 the same reference characters are used as in Fig. 9. The difference is that in the oscillating circuit 4, 5, 6, 7, the voltage divider 6, 7 has a predominantly inductive character, whilst in the oscillating circuit 52, 53, 54, 55, it is not the inductance 52, but the capacity 53 which is varied for tuning. Furthermore the voltage supply and withdrawal of the oscillating circuit 4, 5, 6, 7, are not effected in common over the same part reactance 6 of the voltage divider 6, 7, but are separate, the supply taking place through the part reactance 6 and the removal through the part reactance 7 of the voltage divider 6, 7. The effect as regards the obtaining of constant displacement of the minimum peak points in the resonance curve over the whole tuning range is exactly the same as for the circuit according to Fig. 9.

I claim:

1. An arrangement for increased supression of oscillations lying outside of the filter range in electrical oscillating circuits, comprising the combination with a parallel resonance circuit oscillating in series with an additional reactance and producing a maximum point and a minimum point in the resonance curve, of a further additional reactance in parallel with the aforementioned series arrangement, the connections being such that both the poles for supply as well as the poles for withdrawal of energy at times include at least a part of the parallel resonance circuit and simultaneously at least a part of the additional reactance of the series connection.

2. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of a further additional reactance in parallel with the aforementioned series arrangement, the additional reactances having both the same type of reactance in the tuning range, being both capacitive or both inductive.

3. An arrangement according to claim 1, wherein one of the elements forming the parallel circuit is variable for tuning the system.

4. An arrangement according to claim 1, wherein the additional reactance in parallel with the series connection is in the form of a capacity which exceeds the normal value of the anode-cathode capacity of amplifier tubes.

5. An arrangement according to claim 1, wherein the additional reactance in parallel with the series connection is in the form of a capacity which exceeds the normal value of the anode-cathode capacity of the amplifier tube, said additional capacity being greater than 9 cm. ($=10$ pikofarads $=10\ \mu\mu$ F).

6. An arrangement according to claim 1, wherein the addtional reactance is in the form of a separate condenser arranged in parallel to the series resonance circuit.

7. An arrangement for increased suppression of oscillations lying outside of a filter range in electrical oscillating systems, comprising a parallel resonance circuit in series with an additional reactance, said arrangement having a maximum and a minimum point in the resonance curve, and a further additional reactance connected to the first-mentioned reactance and to the parallel resonance circuit, said additional reactances being in the form of inductances having inductive reactance character in the resonance range.

8. An arrangement for increased suppression of oscillations lying outside of a filter range in electrical oscillating systems, comprising a parallel resonance circuit in series with an additional reactance, said arrangement having a maximum and a minimum point in the resonance curve, a further inductive reactance in parallel with the aforementioned series arrangement, and a second parallel resonance circuit having an opposed asymmetrical resonance curve coupled with the first circuit and connected in series with an additional reactance of capacitive character.

9. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of a further additional reactance in parallel with the aforementioned series arrangement, and at least one additional oscillating circuit coupled with the first-mentioned oscillating circuit and having additional reactances and an opposed asymmetrical resonance curve.

10. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of a further additional reactance in parallel with the aforementioned series arrangement, and at least one additional oscillating circuit coupled with the first-mentioned oscillating circuit and having additional reactances and an opposed asymmetrical resonance curve, the additional reactances of one of the oscillating circuits being inductive and of the other capacitive.

11. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of a further additional reactance in parallel with the aforementioned series arrangement, and at least one additional oscillating circuit coupled with the first-mentioned oscillating circuit and having additional reactances and an opposed asymmetrical resonance curve, the coupled oscillating circuits being arranged in one stage as a band filter.

12. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of an additional capacitive reactance, in parallel with the aforementioned series arrangement, and a second oscillating circuit coupled with the first circuit and including a parallel resonance circuit oscillating in series with an additional reactance and producing a maximum point and a minimum point in the resonance curve and coupled in parallel fashion to a further reactance having inductive reactance character in the resonance range.

13. An arrangement for increased suppression of oscillations lying outside of a filter range in electrical oscillating systems, comprising a parallel resonance circuit in series with an additional reactance, said arrangement having a maximum and a minimum point in the resonance curve, said additional reactance being in the form of an inductance having inductive reactance character in the resonance range.

14. An arrangement according to claim 1, wherein the self-induction of a coil forming part of the parallel resonance circuit is variable for tuning the circuit.

15. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of at least one additional oscillating circuit coupled with the first-mentioned oscillating circuit and having an opposed asymmetrical resonance curve and including a parallel resonance circuit oscillating in series with an additional reactance and producing a maximum point and a minimum point in the resonance curve and having a further additional reactance in parallel with such series arrangement.

16. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of at least one additional oscillating circuit coupled with the first-mentioned oscillating circuit and having an opposed asymmetrical resonance curve and including a parallel resonance circuit oscillating in series with an additional reactance and producing a maximum point and a minimum point in the resonance curve and having a further additional reactance in parallel with such series arrangement, one of the additional reactances being inductive and the other capacitive.

17. An arrangement for increased suppression of oscillations lying outside of the filter range in electrical oscillating circuits, comprising the combination with a parallel resonance circuit oscillating in series with an additional reactance and producing a maximum point and a minimum point in the resonance curve, of at least one additional oscillating circuit coupled with the first-mentioned oscillating circuit in one stage as a band filter and having an opposed asymmetrical resonance curve and including a parallel resonance circuit oscillating in series with an additional reactance and producing a maximum point and a minimum point in the resonance curve and having a further additional reactance in parallel with such series arrangement.

BERNHARD AUGUST MEININGHAUS.